J. V. SANDQUIST.
LINK.
APPLICATION FILED JULY 13, 1920.

1,397,458. Patented Nov. 15, 1921.

J. V. Sandquist
INVENTOR
BY Victor J. Evans
ATTORNEY

WITNESS:

UNITED STATES PATENT OFFICE.

JOHN V. SANDQUIST, OF HOUSTON, TEXAS.

LINK.

1,397,458.　　　　Specification of Letters Patent.　　Patented Nov. 15, 1921.

Application filed July 13, 1920. Serial No. 395,913.

*To all whom it may concern:*

Be it known that I, JOHN V. SANDQUIST, a citizen of Canada, residing at Houston, in the county of Harris and State of Texas, have invented new and useful Improvements in Links, of which the following is a specification.

This invention relates to links for a chain or the like, and comprehends a novel construction whereby the links can be readily and easily connected together or disconnected, and when associated prevented from being casually separated.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein.

Figure 1:
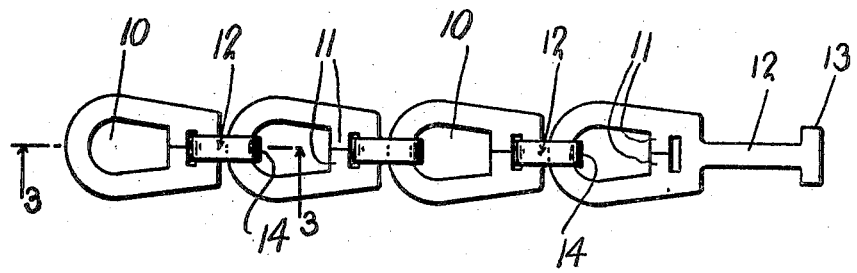
Figure 1 is a fragmentary view of the chain made up of links constructed in accordance with the invention.
Figure 2:
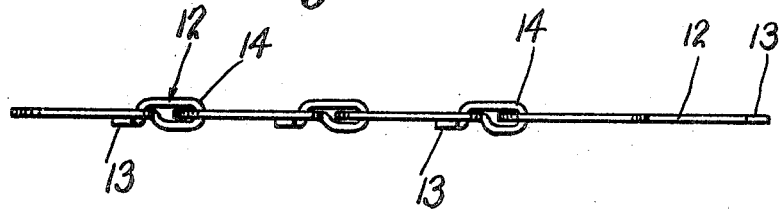
Fig. 2 is an edge elevation.
Figures 3, 4:
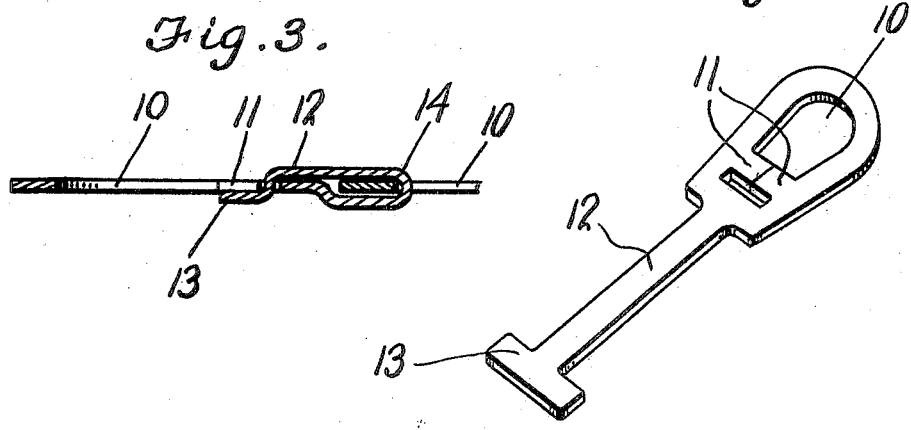
Fig. 3 is a sectional view taken on line 3—3 of Fig. 1.
Fig. 4 is a detail view of one of the links before being connected with an additional link.

The link forming the subject matter of my invention is clearly shown in plan in Fig. 4, the link being constructed of any suitable material and provided with an opening 10 by means of which the various links of the chain may be connected. Projecting from the opposed sides of the opening 10 are bendable lugs 11 of a length to unitedly define a transverse locking bar when the lugs are arranged with their free ends in contacting engagement. Projecting from one end of the link is a bendable T-shaped member 12, the head of which is indicated at 13. The member 12 is adapted to be bent upon itself to provide a loop 14 as clearly shown in Figs. 1 and 2 which loop receives the adjacent end of the next link of the chain as shown. The member 12 is passed through the opening 10 of the adjacent link of the chain and has its head 13 positioned within the opening 10 of the link of which it forms a part. By this association of parts, the lugs 11 are bent at right angles to the link to provide sufficient space for the insertion of the head 13 of the member 12, and after the loop 14 has been formed and the head 13 arranged at one side of the link of which it forms a part, the lugs 11 are bent toward each other unitedly defining a locking bar which is arranged transversely of the opening 10 and at one side of the head 13. By reason of this construction, the various links of the chain can be readily assembled or disassembled as the occasion requires, but when assembled are held locked against casual separation.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What is claimed is:

1. A link comprising a member having an opening therein, and a substantially T-shaped bendable member projecting from one end of the link, bendable lugs projecting from the opposed sides of said opening, the T-shaped member being adapted to be bent upon itself to provide a loop with the head thereof passed through said opening and arranged at one side of the link, and said lugs arranged with their free ends contacting to unitedly define a locking bar arranged to engage one side of the head of said T-shaped member.

2. A link comprising a member having an opening therein, a substantially T-shaped bendable member projecting from one end of the link, a transversely disposed locking bar arranged across said opening, and said member being bent to provide a loop with the head thereof passed through said opening and arranged at one side of and parallel to and engaging said locking bar.

In testimony whereof I affix my signature.

JOHN V. SANDQUIST.